(12) United States Patent
Matsuoka et al.

(10) Patent No.: US 10,540,839 B2
(45) Date of Patent: Jan. 21, 2020

(54) VEHICLE SETTLEMENT SYSTEM AND VEHICLE SETTLEMENT METHOD

(71) Applicant: Toyota Jidosha Kabushiki Kaisha, Toyota-shi, Aichi-ken (JP)

(72) Inventors: Tomohito Matsuoka, Nagoya (JP); Seiichi Tsunoda, Nisshin (JP); Jiro Goto, Seto (JP); Masayuki Yamada, Chofu (JP); Yasutaka Eto, Okazaki (JP); Keima Fukunaga, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/227,751

(22) Filed: Dec. 20, 2018

(65) Prior Publication Data

US 2019/0197816 A1  Jun. 27, 2019

(30) Foreign Application Priority Data

Dec. 26, 2017  (JP) ................. 2017-250209

(51) Int. Cl.
| | |
|---|---|
| *G06F 7/08* | (2006.01) |
| *G07F 11/46* | (2006.01) |
| *G06Q 20/40* | (2012.01) |
| *B60N 3/00* | (2006.01) |
| *G06Q 30/06* | (2012.01) |

(52) U.S. Cl.
CPC ............ *G07F 11/46* (2013.01); *B60N 3/00* (2013.01); *G06Q 20/40145* (2013.01); *G06Q 30/0639* (2013.01)

(58) Field of Classification Search
CPC .............. G01C 21/206; G05D 1/0297; G05D 2201/0216; G06Q 10/0875; G06Q 30/0202
See application file for complete search history.

(56) References Cited

U.S. PATENT DOCUMENTS

| | | | | |
|---|---|---|---|---|
| 4,847,722 A | * | 7/1989 | Bennett | F25D 23/12 361/31 |
| 7,418,311 B1 | * | 8/2008 | Lagassey | G07F 9/026 221/150 R |
| 2003/0191662 A1 | * | 10/2003 | Segrest | G06Q 10/083 705/325 |
| 2008/0111330 A1 | * | 5/2008 | Lurie | A63C 11/026 280/35 |
| 2012/0080517 A1 | * | 4/2012 | Braunstein | G06Q 10/087 235/379 |
| 2013/0006859 A1 | | 1/2013 | Lee | |
| 2013/0092700 A1 | * | 4/2013 | Braunstein | G07F 9/006 221/13 |

(Continued)

FOREIGN PATENT DOCUMENTS

JP  2013-012170 A  1/2013

*Primary Examiner* — Thien M Le
(74) *Attorney, Agent, or Firm* — Dinsmore & Shohl LLP

(57) ABSTRACT

In order to settle the sales transaction of an item in a cabin, an item detection unit of a vehicle settlement system detects removal of the item from an item arrangement unit provided in the cabin. An item monitoring unit monitors movement of the item when the item detection unit detects the removal of the item. A settlement processor settles the sales transaction of the item detected by the item detection unit when a predetermined condition is satisfied after the item monitoring unit detects the movement of the item out of a vehicle.

6 Claims, 7 Drawing Sheets

(56) References Cited

U.S. PATENT DOCUMENTS

| | | | |
|---|---|---|---|
| 2014/0316561 A1* | 10/2014 | Tkachenko | G07F 11/002 |
| | | | 700/236 |
| 2017/0272418 A1* | 9/2017 | Kim | H04L 63/08 |
| 2018/0260778 A1* | 9/2018 | Mazetti | G06Q 10/0875 |
| 2019/0129444 A1* | 5/2019 | Wirth | G05D 1/0274 |

* cited by examiner

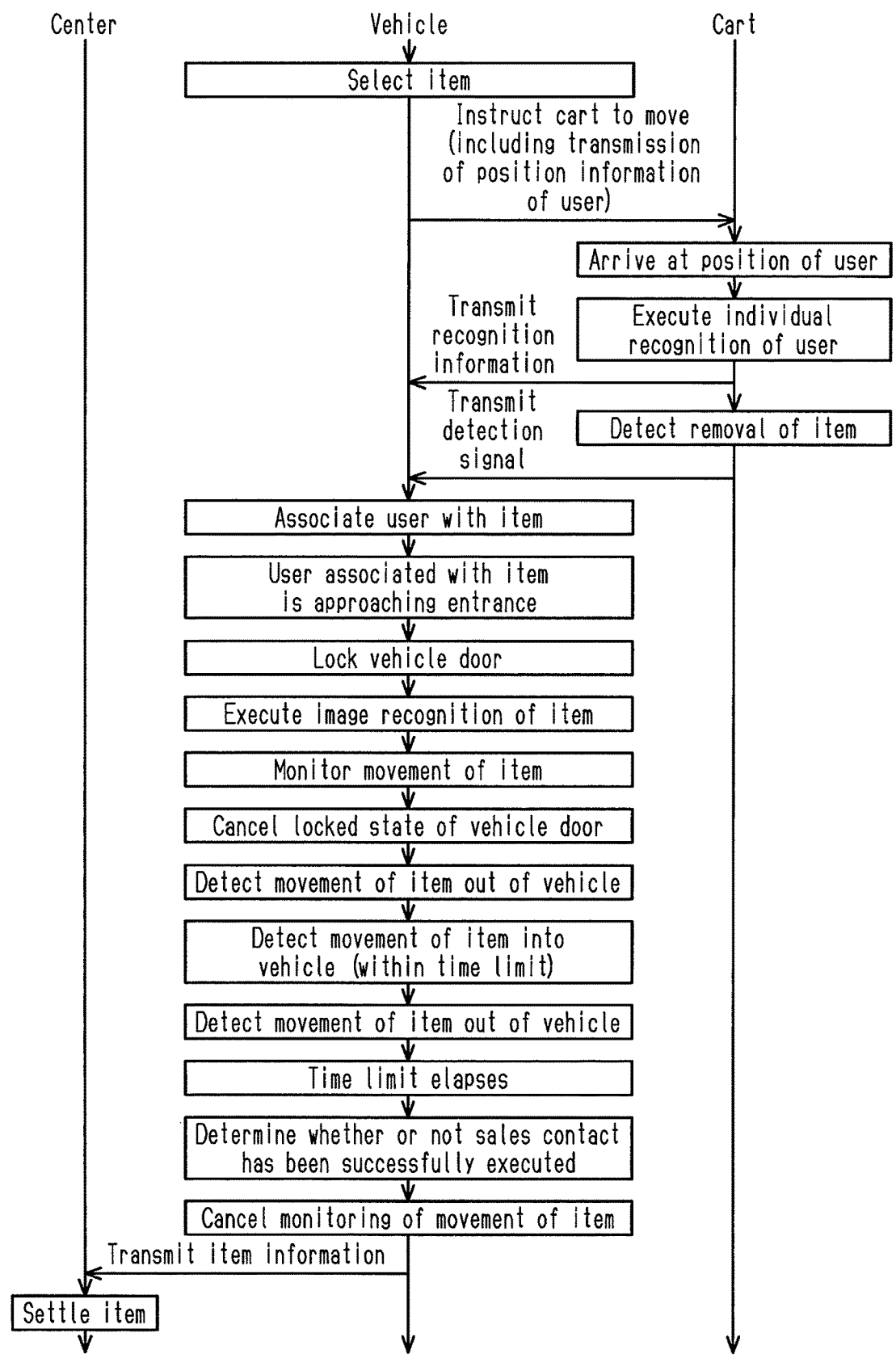

VEHICLE SETTLEMENT SYSTEM AND VEHICLE SETTLEMENT METHOD

CROSS-REFERENCE TO RELATED APPLICATION

This application claims priority to Japanese Patent Application No. 2017-250209 filed on Dec. 26, 2017, incorporated herein by reference in its entirety.

BACKGROUND

The present disclosure relates to a vehicle settlement system and a vehicle settlement method that settle the sales transaction of an item in the cabin.

Japanese Laid-Open Patent Publication No. 2013-12170 describes an example of a system that performs payment, as a settlement system, by transmitting the payment information to the payment terminal of a store (filling station) via a human body communication unit, which is provided in the vehicle terminal. This increases the convenience for the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In the system of the above-described document, when payment is performed, the user needs to simultaneously touch the human body communication unit in the vehicle terminal and the payment terminal of the store. Thus, there is still room for increasing the convenience for the user.

It is an object of the present disclosure to provide a vehicle settlement system that increases the convenience for the user when settling the sales transaction of an item in the cabin.

Examples of the present disclosure will now be described.

Example 1

A vehicle settlement system that settles a sales transaction of an item in a cabin. The vehicle settlement system includes an item detection unit configured to detect removal of the item from an item arrangement unit provided in the cabin, an item monitoring unit configured to monitor movement of the item when the item detection unit detects the removal of the item, and a settlement processor (settlement processing unit) configured to settle the sales transaction of the item detected by the item detection unit when a predetermined condition is satisfied after the item monitoring unit detects the movement of the item out of a vehicle.

With the above-described configuration, as the item moves out of the vehicle, the payment for an item is automatically performed. This increases the convenience for the user when settling the sales transaction of the item in the cabin.

Example 2

In the vehicle settlement system of example 1, the settlement processor is configured to settle the sales transaction of the item when a predetermined period elapses after the item monitoring unit detects the movement of the item out of the vehicle.

With the above-described configuration, when a predetermined period elapses after the item moves out of the vehicle, the sales transaction is automatically settled. This further increases the convenience for the user when settling the sales transaction of the item in the cabin.

Example 3

In the vehicle settlement system of example 2, the settlement processor is configured to cancel the sales transaction of the item when the item monitoring unit detects the movement of the item into the vehicle before the predetermined period elapses from a point in time at which the item monitoring unit detects the movement of the item out of the vehicle.

With the above-described configuration, returning the item that has been moved out of the vehicle into the vehicle cancels the sales transaction of the item. This further increases the convenience for the user when performing the sales transaction of the item in the cabin.

Example 4

The vehicle settlement system of any one of the examples 1 to 3 further includes a door lock mechanism that locks a vehicle door and an item recognition unit configured to recognize the item removed from the item arrangement unit. The door lock mechanism is configured to set the vehicle door to a locked state when the item detection unit detects the removal of the item from the item arrangement unit and cancel the locked state of the vehicle door when the item recognition unit recognizes the item.

With the above-described configuration, at the point in time when the item is removed from the item arrangement unit, the vehicle door is set to the locked state. This ensures the identification of the type of the item at the point in time before the item is carried out of the vehicle while preventing the item from being carried out of the vehicle in an unauthorized manner.

Example 5

The vehicle settlement system of example 4 further includes an individual recognition unit configured to perform individual recognition of a user. The item monitoring unit is configured to associate the user recognized by the individual recognition with the item detected by the item detection unit when the item detection unit detects the removal of the item from the item arrangement unit. The door lock mechanism is configured to set the vehicle door to the locked state when the user associated with the item moves to an entrance of the vehicle.

With the above-described configuration, when an item is removed from the item arrangement unit, the item is associated with the user. Thus, even if users are riding in the vehicle, a specific user is prevented from carrying the item out of the vehicle in an unauthorized manner.

Example 6

A vehicle settlement method for executing the various types of processes described in the above-described examples 1 to 5.

Example 7

A non-transitory computer-readable storage medium that stores a program that causes a processor to execute the various types of processes described in the above-described examples 1 to 5.

Other features, aspects, and advantages will become apparent from the following description, taken in conjunction with the accompanying drawings, and the claims.

BRIEF DESCRIPTION OF THE DRAWINGS

FIG. 7 is a sequence chart illustrating the flow of processes performed until completion of payment for an item in a vehicle settlement system according to a third embodiment of the present disclosure.

DETAILED DESCRIPTION

Figure 1:
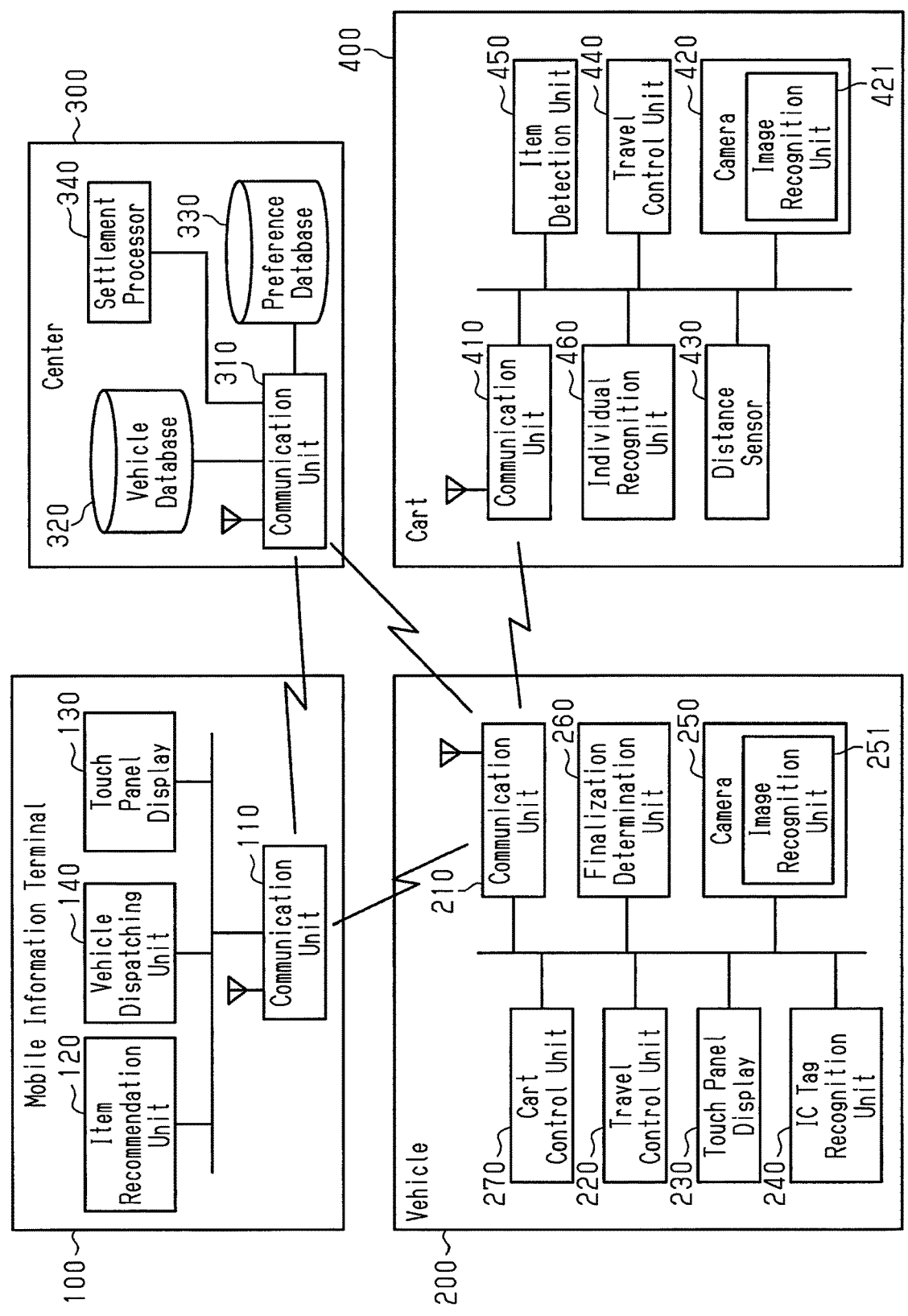
FIG. 1 is a block diagram illustrating the schematic configuration of a vehicle settlement system according to a first embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be through and complete, and will convey the full scope of the disclosure to one of ordinary skill in the art.

Words describing relative spatial relationships, such as "below", "beneath", "under", "lower", "bottom", "above", "over", "upper", "top", "left", and "right", may be used to conveniently describe spatial relationships of one device or elements with other devices or elements. Such words are to be interpreted as encompassing a device oriented as illustrated in the drawings, and in other orientations in use or operation. For example, an example in which a device includes a second layer disposed above a first layer based on the orientation of the device illustrated in the drawings also encompasses the device when the device is flipped upside down in use or operation.

First Embodiment

A vehicle settlement system according to a first embodiment of the present disclosure will now be described with reference to FIGS. 1 to 4.

As shown in FIG. 1, the vehicle settlement system of the present embodiment causes the user to select an item displayed on the display screen of a mobile information terminal 100, dispatches a vehicle 200 carrying the selected item for the user of the mobile information terminal 100, and settles the sales transaction of the item in the cabin.

The mobile information terminal 100 includes a communication unit 110, an item recommendation unit 120, a touch panel display 130, and a vehicle dispatching unit 140.

The communication unit 110 is capable of communicating with a communication unit 310 of a center 300, and obtains various types of information from the database managed by the center 300. The present embodiment includes, as an example of the database, a vehicle database 320, in which the traveling information of a plurality of vehicles is managed, and a preference database 330, in which the preference information of the users of a plurality of mobile information terminals 100 is managed.

The item recommendation unit 120 obtains the preference information of the users managed by the preference database 330 of the center 300 via the communication unit 110 and recommends an item serving as a candidate of purchase based on the obtained preference information of the users.

The touch panel display 130 presents the user of the mobile information terminal 100 with the selection screen of the item that is recommended by the item recommendation unit 120 and serves as a candidate of purchase.

When an item that the user wishes to purchase is selected via the touch panel display 130, the vehicle dispatching unit 140 requests the center 300 for the information relevant to the vehicle carrying the selected item. Then, the vehicle dispatching unit 140 obtains the vehicle information managed by the vehicle database 320 of the center 300 via the communication unit 110 and dispatches the vehicle 200 for the user based on the position information of the vehicle 200 included in the obtained vehicle information.

The vehicle 200 includes a communication unit 210, a travel control unit 220, a touch panel display 230, an IC tag recognition unit 240, a camera 250, a finalization determination unit 260, and a cart control unit 270.

The communication unit 210 is capable of communicating with the communication unit 110 of the mobile information terminal 100, and accepts a request of dispatching the vehicle 200 from the mobile information terminal 100.

The travel control unit 220 controls autonomous traveling of the vehicle 200. When accepting a request of dispatching the vehicle 200 from the mobile information terminal 100, the travel control unit 220 causes the vehicle 200 to travel in accordance with a travel route that is set between the position of the mobile information terminal 100 and the position of the vehicle 200.

The touch panel display 230 presents the user with the selection screen of an item serving as a candidate of purchase from the items carried by the vehicle 200.

The IC tag recognition unit 240 is a non-contact sensor provided at the entrance of the vehicle 200. The IC tag recognition unit 240 recognizes the IC tag attached to an item to detect the movement of the item into and out of the vehicle.

The camera 250 captures an image of the inside of the cabin. When an image recognition unit 251 performs image recognition processing on the captured image, the camera 250 detects the position of an occupant in the vehicle 200.

The finalization determination unit 260 determines whether or not the sales contract of an item has been successfully executed in the cabin. When the finalization determination unit 260 determines that the sales contract of the item has been successfully executed, the finalization determination unit 260 transmits the information of the item to the center 300 via the communication unit 210. Based on the item information received from the vehicle 200, the center 300 settles the sales transaction of the matching item via a settlement processor (settlement processing unit) 340.

The cart control unit 270 is capable of communicating with a cart 400, which is arranged in the cabin, and controls the arrangement of the cart 400 in the cabin.

The cart 400 includes a communication unit 410, a camera 420, a distance sensor 430, a travel control unit 440, an item detection unit 450, and an individual recognition unit 460.

The communication unit 410 is capable of communicating with the communication unit 210 of the vehicle 200, and obtains information relevant to movement control of the cart 400 from the cart control unit 270.

The camera 420 captures an image of the inside of the cabin from the viewpoint of the cart 400. When the image recognition unit 421 performs image recognition processing on the captured image, the camera 420 detects the position of an occupant located around the cart 400.

The distance sensor 430 is a non-contact sensor and detects the distance between the occupant detected by the camera 420 and the cart 400.

The travel control unit 440 controls autonomous traveling of the cart 400 so as to maintain a predetermined distance between the occupant detected by the distance sensor 430 and the cart 400.

The item detection unit 450 detects whether or not the cart 400 is carrying an item and detects the carriage of the item on the cart 400 and the removal of the item from the cart 400.

When the item detection unit 450 detects the removal of the item from the cart 400, the individual recognition unit 460 recognizes the occupant located around the cart 400 as an occupant dealing with the item. The recognition of an occupant includes, for example, vein recognition, face recognition, and iris recognition. That is, the individual recognition unit 460 performs individual recognition of the user.

The change of the display screen of the mobile information terminal 100 that occurs when the vehicle 200 is dispatched through operation of the mobile information terminal 100 will now be described.

In the following description, when the mobile information terminal 100 is described to perform an operation, the actual agent of the operation may be a terminal processor incorporated in the mobile information terminal 100. Specifically, when the mobile information terminal 100 is described to perform various types of operations, the terminal processor may execute programs stored in the memory of the mobile information terminal 100. Based on the instruction from the terminal processor, various types of devices incorporated in the mobile information terminal 100 may execute operations. That is, "the terminal processor or various types of devices of the mobile information terminal 100 execute various types of operations" may be hereinafter simply referred to as "the mobile information terminal 100 performs various types of operations." In the same manner, when the vehicle 200 is described to perform an operation, the actual agent of the operation may be a vehicle processor incorporated in the vehicle 200. Specifically, when the vehicle 200 is described to perform various types of operations, the vehicle processor may execute programs stored in the memory of the vehicle 200. Based on the instruction from the vehicle processor, various types of devices incorporated in the vehicle 200 may execute operations. That is, "the vehicle processor or various types of devices of the vehicle 200 execute various types of operations" may be hereinafter simply referred to as "the vehicle 200 performs various types of operations." In the same manner, when the center 300 is described to perform an operation, the actual agent of the operation may be a center processor incorporated in the center 300. Specifically, when the center 300 is described to perform various types of operations, the center processor may execute programs stored in the memory of the center 300. Based on the instruction from the center processor, various types of devices incorporated in the center 300 may execute operations. That is, "the center processor or various types of devices of the center 300 execute various types of operations" may be hereinafter simply referred to as "the center 300 performs various types of operations." In the same manner, when the cart 400 is described to perform an operation, the actual agent of the operation may be a cart processor incorporated in the cart 400. Specifically, when the cart 400 is described to perform various types of operations, the cart processor may execute programs stored in the memory of the cart 400. Based on the instruction from the cart processor, various types of devices incorporated in the cart 400 may execute operations. That is, "the cart processor or various types of devices of the cart 400 execute various types of operations" may be hereinafter simply referred to as "the cart 400 performs various types of operations."

Figure 2:
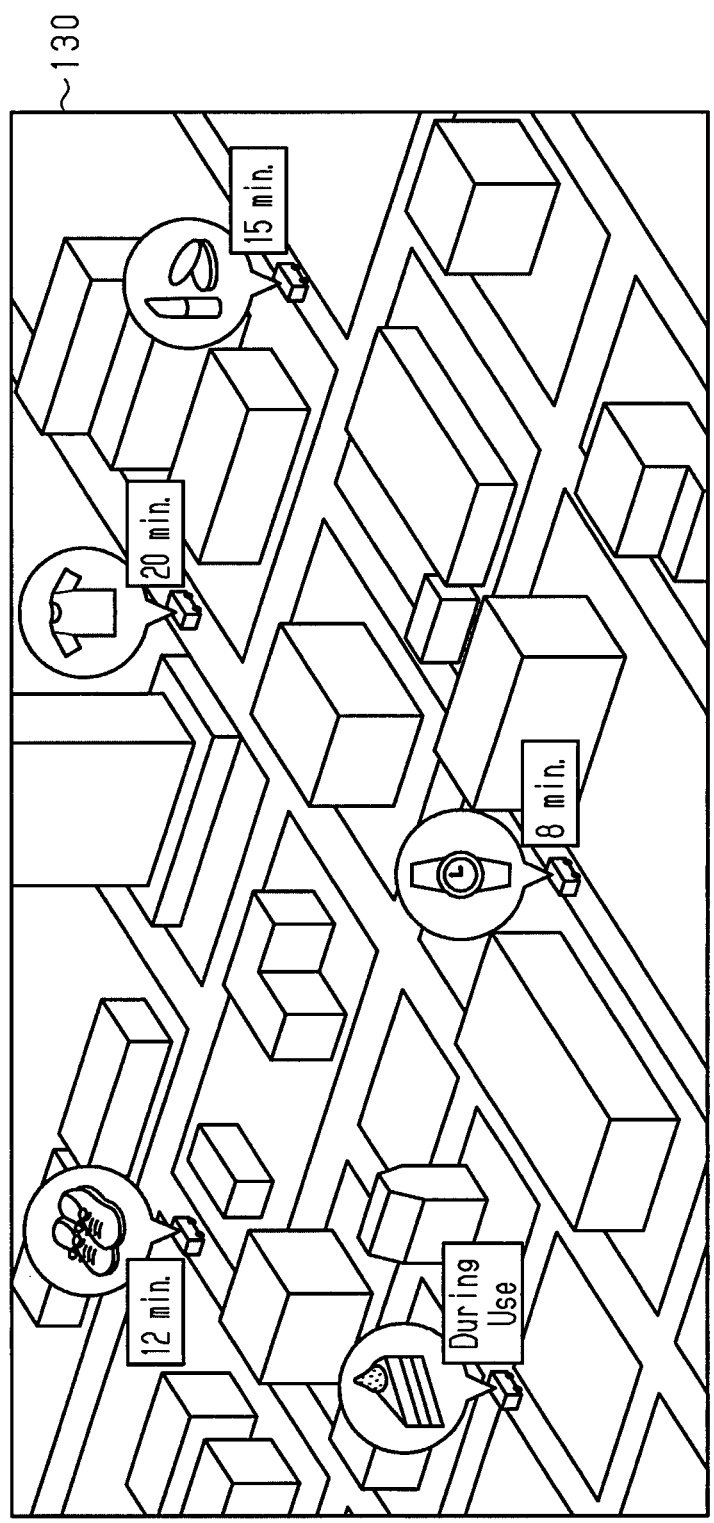
FIG. 2 is a schematic diagram illustrating an example of map data including the positional relationship of vehicles carrying recommended items in the vehicle settlement system of FIG. 1.

Referring to FIG. 2, the mobile information terminal 100 first displays map data on the touch panel display 130. The map data indicates the positional relationship of vehicles 200 carrying items recommended by the item recommendation unit 120. In association with the display position of the image of each vehicle 200, the mobile information terminal 100 displays the image of the corresponding item carried by the vehicle 200. Further, in association with the display position of the image of each vehicle 200, the mobile information terminal 100 displays the corresponding estimated time before the vehicle 200 arrives at the position of the user. The estimated time is calculated on the basis of the travel distance of the vehicle 200 along the travel route, which is set based on the position of the user and the position of the vehicle 200. When the travel route includes a closed section, the mobile information terminal 100 searches for another travel route and calculates the estimated time on the basis of the traveling distance along the other travel route. In addition, when a subject vehicle 200 is being used by another user, the mobile information terminal 100 displays an image serving as a sign indicating that the vehicle 200 is being used in association with the display position of the image of the vehicle 200.

Figure 3:
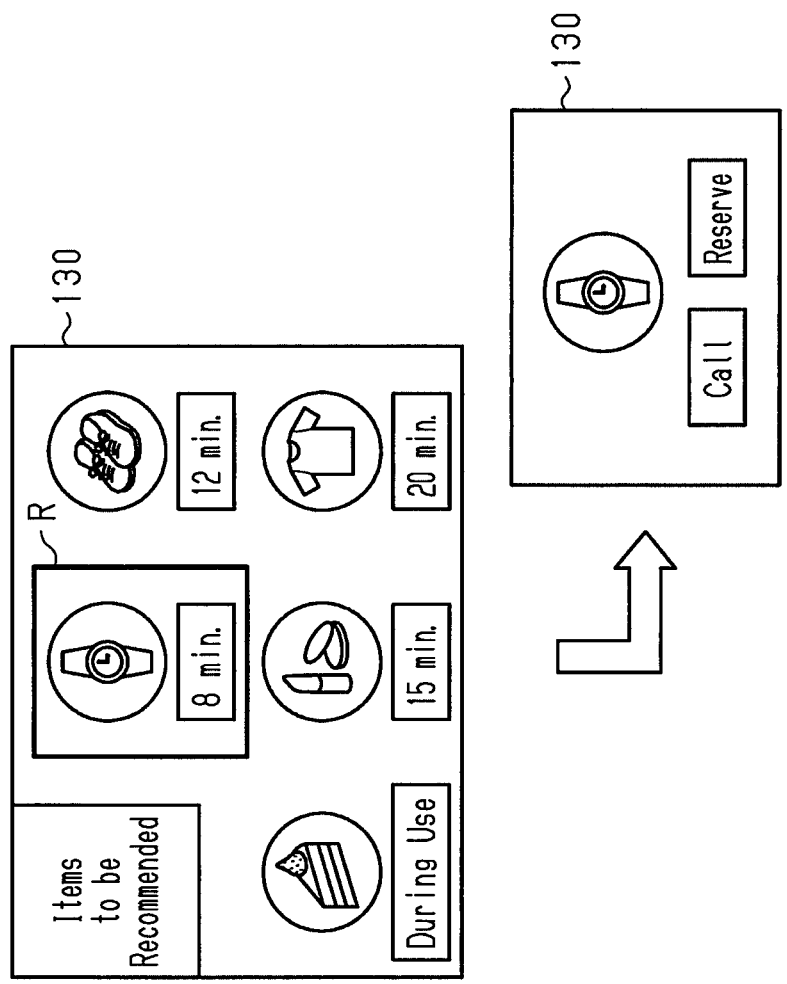
FIG. 3 is a schematic diagram illustrating an example of the selection screen of items in the vehicle settlement system of FIG. 1.

Referring to FIG. 3, when the selection screen of items is displayed on the touch panel display 130 through operation of the mobile information terminal 100, the mobile information terminal 100 displays the image of the items subject to the selection in parallel to the estimated time before the vehicle carrying each item arrives. When the item selection is confirmed through a determination operation with a predetermined item surrounded by a selection frame R, the mobile information terminal 100 displays a display screen used to dispatch the vehicle 200 carrying the item. The method for dispatching the vehicle 200 includes a method for immediately calling a vehicle and a method for reserving the dispatch of a vehicle.

The flow of processes for performing the sales transaction of an item in the cabin in the present embodiment will now be described.

Figure 4:
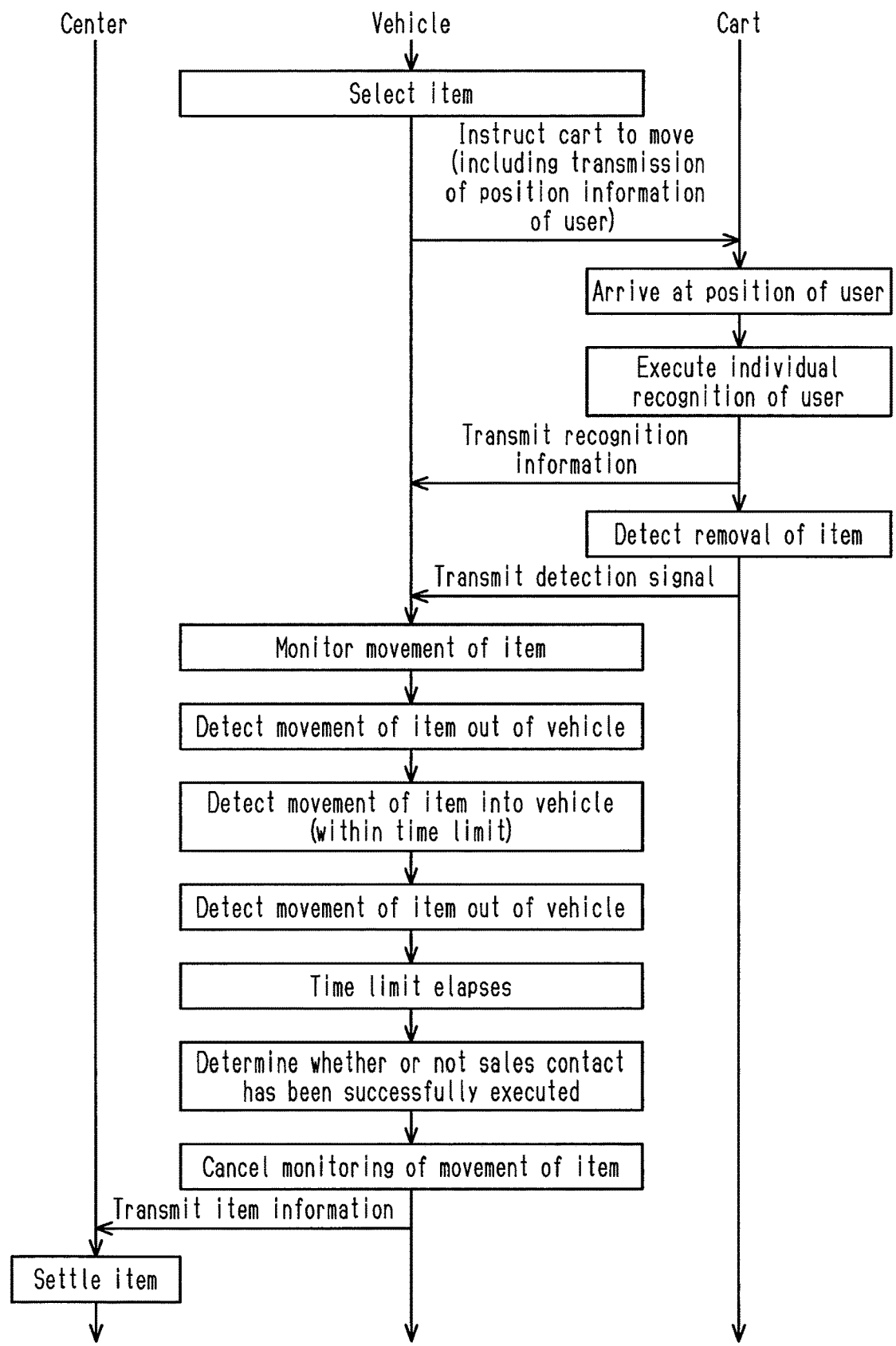
FIG. 4 is a sequence chart illustrating the flow of processes performed until completion of payment for an item in the vehicle settlement system of FIG. 1.

As shown in FIG. 4, the vehicle 200 first selects an item subject to purchase through operation of the touch panel display 230. The vehicle 200 may select an item subject to purchase by receiving input of the information of an item selected through operation of the mobile information terminal 100.

Then, the vehicle 200 instructs a cart 400 corresponding to the selected item to move. The vehicle 200 also transmits the position information of the user detected by the camera 250 to the cart 400.

Based on the position information of the user received from the vehicle 200, the cart 400 autonomously travels so as to approach the user. Upon arrival at the position of the user, the cart 400 executes individual recognition of the user via the individual recognition unit 460. The cart 400 transmits recognition information obtained through the individual recognition of the user to the vehicle 200.

Subsequently, when the item detection unit 450 detects the removal of the item, the cart 400 transmits a detection signal to the vehicle 200. The cart 400 also transmits the identification number of the item associated with the identification number of the cart 400.

Upon receipt of the detection signal indicating the removal of the item from the cart 400, the vehicle 200 monitors the movement of the matching item using the camera 250 serving as an item monitoring unit.

When the user gets out of the vehicle carrying the item, the vehicle 200 monitors the movement of the item out of the vehicle using the camera 250. The vehicle 200 determines that the item carried by the user out of the vehicle is subject to the sales transaction.

When, after the user gets out of the vehicle, the user returns into the vehicle carrying the item before a time limit elapses, the vehicle 200 detects the movement of the item into the vehicle using the camera 250. Then, the vehicle 200 cancels the sales transaction of the item that has been determined as the subject of the sales transaction.

When the user gets out of the vehicle again carrying the item, the vehicle 200 detects the movement of the item out of the vehicle using the camera 250.

Then, when the time limit elapses after the item moves out of the vehicle, the vehicle 200 determines that the sales contract of the item has been successfully executed and confirms the sales transaction of the item as a subject to be settled.

Thereafter, the vehicle 200 cancels the monitoring of the item using the camera 250 and then transmits the information of the item from the vehicle 200 to the center 300.

Based on the item information received from the vehicle 200, the center 300 executes the settlement processing of settling the sales transaction of the matching item.

As described above, the first embodiment has the following advantages.

(1) As the item moves out of the vehicle, payment for an item is automatically performed. This increases the convenience for the user when settling the sales transaction of the item in the cabin.

(2) When a predetermined period elapses after the item moves out of the vehicle, the sales transaction is automatically settled. This further increases the convenience for the user when settling the sales transaction of the item in the cabin.

(3) Returning the item that has been moved out of the vehicle into the vehicle cancels the sales transaction of the item. This further increases the convenience for the user when performing the sales transaction of the item in the cabin.

Second Embodiment

A vehicle settlement system according to a second embodiment will now be described with reference to FIGS. 5 and 6. The second embodiment differs from the first embodiment in that the vehicle includes a door lock mechanism. Thus, the following description focuses on the configuration that differs from the first embodiment. The configuration that is the same as or corresponds to the first embodiment will not be described.

Figure 5:
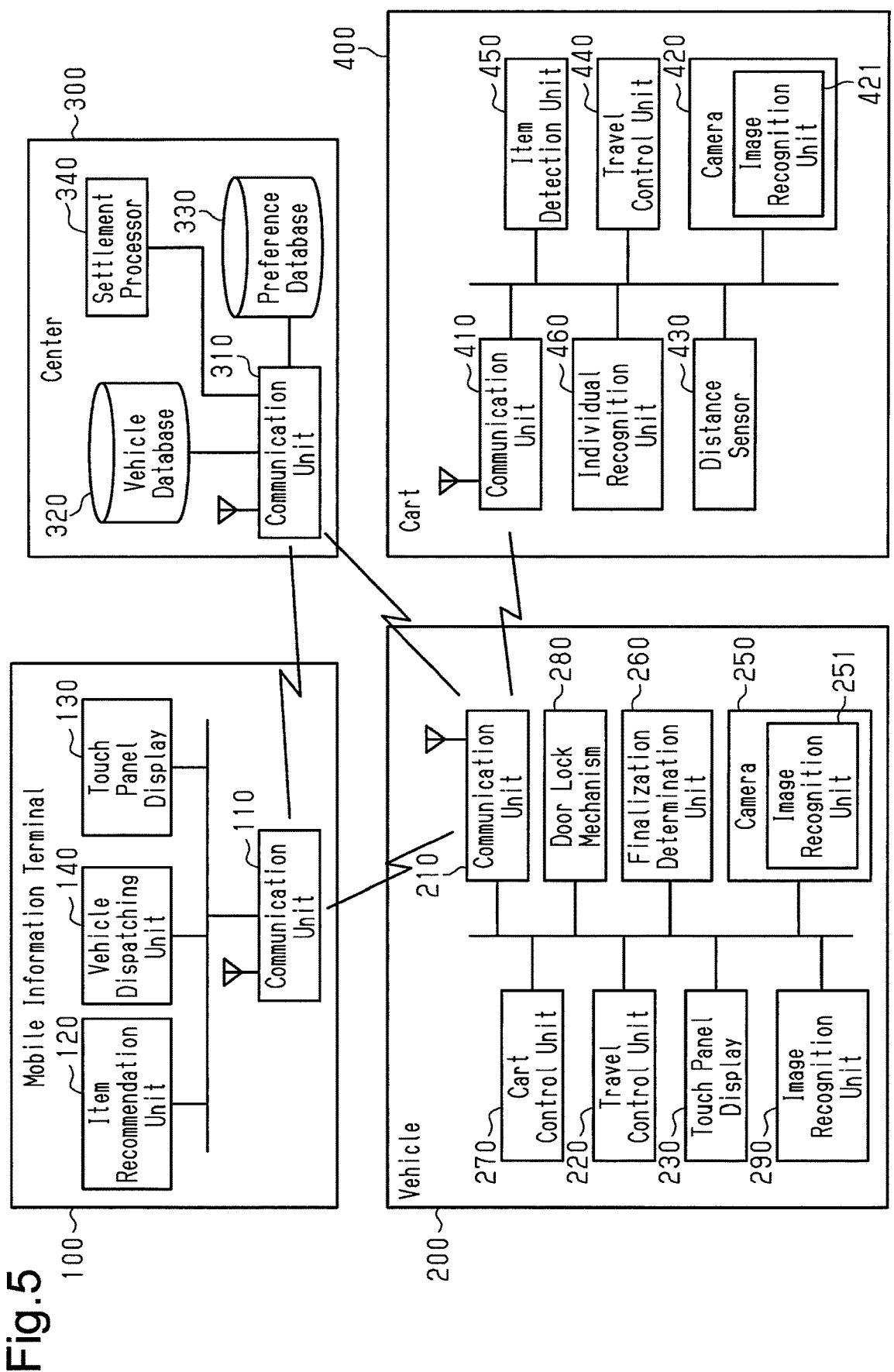
FIG. 5 is a block diagram illustrating the schematic configuration of a vehicle settlement system according to a second embodiment of the present disclosure.

As shown in FIG. 5, the present embodiment further includes a door lock mechanism 280 in addition to the communication unit 210, the travel control unit 220, the touch panel display 230, the camera 250, the finalization determination unit 260, and the cart control unit 270. Additionally, the vehicle 200 includes an image recognition unit 290 instead of the IC tag recognition unit 240.

When the item detection unit 450 detects the removal of an item, the door lock mechanism 280 switches the vehicle door to a locked state.

The image recognition unit 290 performs image recognition processing on an item to recognize the item. In the image recognition processing, for example, the type of the item can be recognized from the image of the item by performing machine learning in which data associating the shape and type of the item with each other is treated as training data.

When the image recognition unit 290 recognizes the item, the door lock mechanism 280 cancels the locked state of the vehicle door, which is set by the door lock mechanism 280.

The flow of processes for performing the sales transaction of an item in the cabin in the present embodiment will now be described.

Figure 6:
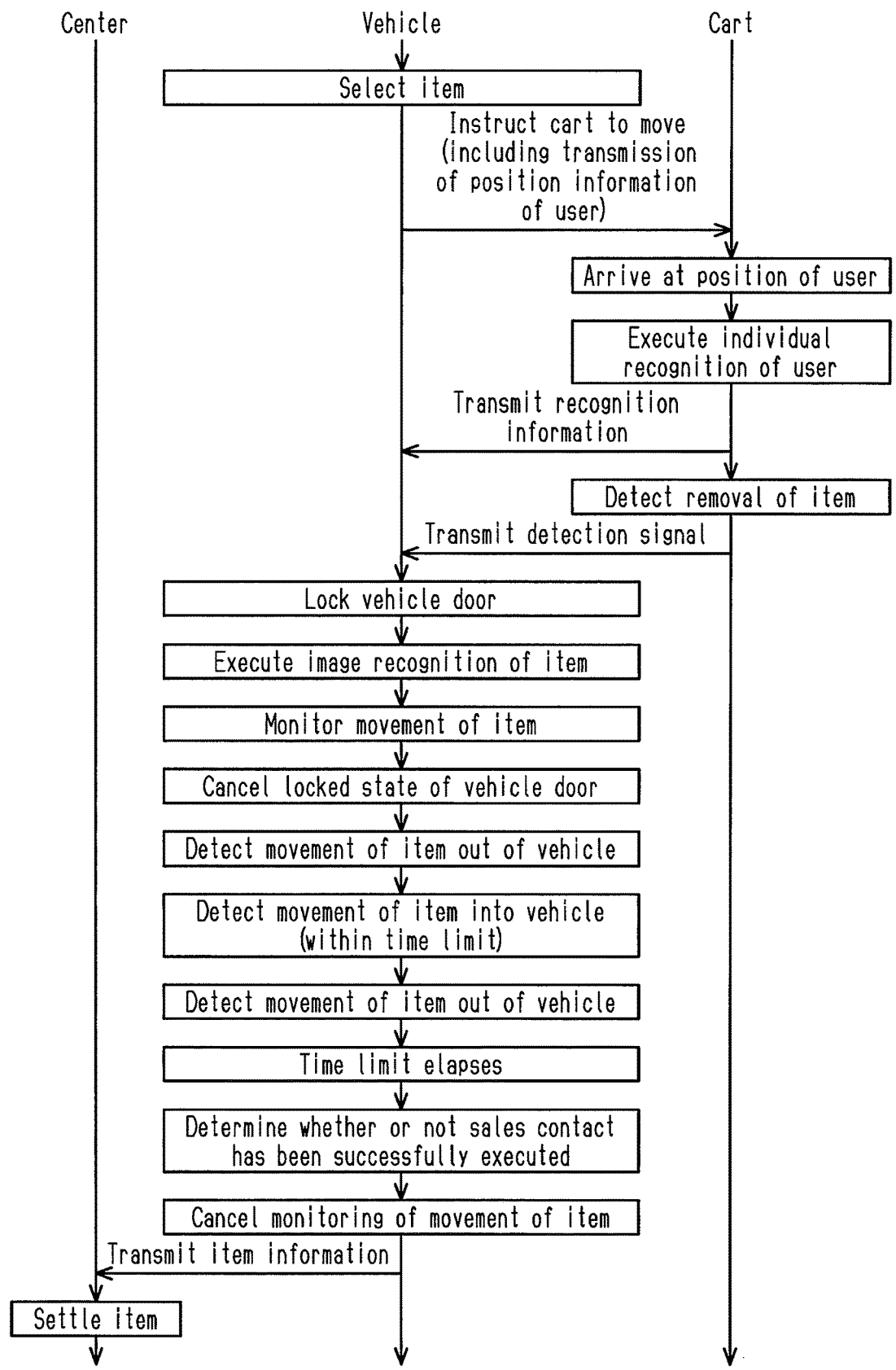
FIG. 6 is a sequence chart illustrating the flow of processes performed until completion of payment for an item in the vehicle settlement system of FIG. 5.

As shown in FIG. 6, the vehicle 200 first selects an item subject to purchase through operation of the touch panel display 230.

Then, the vehicle 200 instructs a cart 400 corresponding to the selected item to move. The vehicle 200 also transmits the position information of the user detected by the camera 250 to the cart 400.

Based on the position information of the user received from the vehicle 200, the cart 400 autonomously travels so as to approach the user. Upon arrival at the position of the user, the cart 400 executes individual recognition of the user via the individual recognition unit 460. The cart 400 transmits recognition information obtained through the individual recognition of the user to the vehicle 200.

Subsequently, when the item detection unit 450 detects the removal of the item, the cart 400 transmits a detection signal to the vehicle 200. The cart 400 also transmits the identification number of the item associated with the identification number of the cart 400.

Upon receipt of the detection signal indicating the removal of the item from the cart 400, the vehicle 200 sets the vehicle door to the locked state using the door lock mechanism 280.

Next, the vehicle 200 executes image recognition of the item using the image recognition unit 290. That is, the image recognition unit 290 acts as an item recognition unit that recognizes the item removed from the cart 400. The vehicle 200 cancels the locked state of the vehicle door, which is set by the door lock mechanism 280, while starting monitoring the return of the recognized item.

Subsequently, when the user gets out of the vehicle carrying the item, the vehicle 200 monitors the movement of the item out of the vehicle using the camera 250. The vehicle 200 determines that the item carried by the user out of the vehicle is subject to the sales transaction.

When, after the user gets out of the vehicle, the user returns into the vehicle carrying the item before a time limit elapses, the vehicle 200 detects the movement of the item into the vehicle using the camera 250. Then, the vehicle 200 cancels the sales transaction of the item.

When the user gets out of the vehicle again carrying the item, the vehicle 200 detects the movement of the item out of the vehicle using the camera 250.

When, after the item moves out of the vehicle, the time limit elapses, the vehicle 200 determines that the sales contract of the item has been successfully executed and confirms the sales transaction of the item as a subject to be settled.

Thereafter, the vehicle 200 cancels the monitoring of the item using the camera 250 and then transmits the information of the item from the vehicle 200 to the center 300.

Based on the item information received from the vehicle 200, the center 300 executes the settlement processing of settling the sales transaction of the matching item.

As described above, the second embodiment has the following advantage in addition to advantages (1) to (3) of the first embodiment.

(4) At the point in time when the item is removed from the cart 400, the vehicle door is set to the locked state. This ensures the identification of the type of the item at the point in time before the item is carried out of the vehicle 200 while preventing the item from being carried out of the vehicle 200 in an unauthorized manner.

Third Embodiment

A vehicle settlement system according to a third embodiment will now be described with reference to FIG. 7. The third embodiment differs from the second embodiment in that the user and an item are associated with each other when the item is removed from the cart 400. Thus, the following description focuses on the configuration that differs from the second embodiment. The configuration that is the same as or corresponds to the second embodiment will not be described.

As shown in FIG. 7, in the present embodiment, when the sales transaction of an item in the cabin is performed, the vehicle 200 first selects an item subject to purchase based on the operation result of the touch panel display 230.

Then, the vehicle 200 instructs a cart 400 corresponding to the selected item to move. The vehicle 200 also transmits the position information of the user detected by the camera 250 to the cart 400.

Based on the position information of the user received from the vehicle 200, the cart 400 autonomously travels so as to approach the user. Upon arrival at the position of the user, the cart 400 executes individual recognition of the user via the individual recognition unit 460. The cart 400 transmits recognition information obtained through the individual recognition of the user to the vehicle 200.

Subsequently, when the item detection unit 450 detects the removal of the item, the cart 400 transmits a detection signal to the vehicle 200. The cart 400 also transmits the identification number of the item associated with the identification number of the cart 400.

Upon receipt of the detection signal indicating the removal of the item from the cart 400, the vehicle 200 associates the user recognized individually with the type of the item identified based on the identification number of the item.

When the user associated with the item removed from the cart 400 approaches the entrance of the vehicle 200, the vehicle 200 sets the vehicle door to the locked state using the door lock mechanism 280.

Next, the vehicle 200 executes image recognition of the item using the image recognition unit 290. The vehicle 200 cancels the locked state of the vehicle door, which is set by the door lock mechanism 280, while starting monitoring the return of the recognized item.

Subsequently, when the user gets out of the vehicle carrying the item, the vehicle 200 monitors the movement of the item out of the vehicle using the camera 250. The vehicle 200 determines that the item carried by the user out of the vehicle is subject to the settlement of the sales transaction.

When, after the user gets out of the vehicle, the user returns into the vehicle carrying the item before a time limit elapses, the vehicle 200 detects the movement of the item into the vehicle using the camera 250. Then, the vehicle 200 cancels the sales transaction of the item.

When the user gets out of the vehicle again carrying the item, the vehicle 200 detects the movement of the item out of the vehicle using the camera 250.

When the time limit elapses after the item moves out of the vehicle, the vehicle 200 confirms the sales transaction of the item as a settlement subject and determines that the purchase of the item has been finalized.

Thereafter, the vehicle 200 cancels the monitoring of the item using the camera 250 and then transmits the information of the item from the vehicle 200 to the center 300.

Based on the item information received from the vehicle 200, the center 300 settles the sales transaction of the matching item.

As described above, the second embodiment has the following advantage in addition to advantages (1) to (4) of the second embodiment.

(5) When an item is removed from the cart 400, the item is associated with the user. Thus, even if users are riding in the vehicle 200, a specific user is prevented from carrying the item out of the vehicle 200 in an unauthorized manner.

It should be apparent to those skilled in the art that the present disclosure may be embodied in many other specific forms without departing from the spirit or scope of the disclosure. Particularly, it should be understood that the present disclosure may be embodied in the following forms.

In the second and third embodiments, when the user associated with the item moves to the entrance of the vehicle 200, the vehicle 200 sets the vehicle door to the locked state. Instead, the vehicle 200 may identify an item when the item is removed from the cart 400 and may set the vehicle door to the locked state when the identified item moves to the entrance of the vehicle 200. In short, when the item removed from the cart approaches the entrance of the vehicle 200, the vehicle 200 may set the vehicle door to the locked state in order to prevent theft of the item.

In the third embodiment, the vehicle 200 cancels the locked state of the vehicle door when the image recognition unit 290 recognizes the item. Instead, the vehicle 200 may cancel the locked state of the vehicle door when the image recognition unit 290 recognizes the item and also performs individual recognition of the user. In short, when the locked state of the vehicle door is cancelled, the item removed from the cart 400 simply needs to be associated with the user serving as the purchaser of the item.

In each of the above embodiments, the vehicle 200 cancels the sales transaction when the movement of the item into the vehicle 200 is detected before the predetermined period elapses from the point in time after the movement of the item out of the vehicle 200 is detected. Instead, without detecting the movement of the item into and out of the vehicle 200, the vehicle 200 may cancel the sales transaction of the item when the item is returned to the cart 400 before the predetermined period elapses from the point in time after the cart 400 is removed. In short, the sales transaction of the item may be cancelled when the item is returned before the predetermined condition is satisfied after the item moves out of the vehicle 200.

In each of the above embodiments, the vehicle 200 determines that the sales contract of the item has been successfully executed when the predetermined period elapses from the point in time after the movement of the item out of the vehicle 200 is detected. Instead, the vehicle 200 may determine that the sales contract of the item has been successfully executed when the predetermined period elapses from the point in time after the cart 400 is removed. In short, the vehicle 200 may determine that the sales contract of the item has been successfully executed when the user is less likely to return the item.

In each of the above embodiments, the vehicle 200 causes the cart 400 having the function of autonomous traveling to carry items. That is, the cart 400 is an item arrangement unit provided in the cabin. Instead, the vehicle 200 may include a fixed-type item shelf as an item arrangement unit, and items may be carried on the item shelf.

In the second embodiment, the vehicle 200 recognizes the type of an item from the image of the item using machine learning. Instead, the vehicle 200 may recognize the type of an item by reading a mark such as a barcode or a two-dimensional barcode (QR Code: registered trademark) attached to the item. In short, the vehicle 200 simply needs to recognize the type of an item through image recognition processing on the item.

In each of the above embodiments, the mobile information terminal 100 dispatches the vehicle 200 carrying items to the position of the user. Instead, the mobile information terminal 100 may dispatch the vehicle 200 carrying items to a position that has been designated in advance. As another option, the vehicle 200 may be dispatched using an information processing terminal (such as a personal computer) possessed by the user.

The controller that implements various types of operations includes a CPU and a ROM and executes various types of software processing in the mobile information terminal 100, the vehicle 200, the center 300, and the cart 400 but is not limited to this configuration. For example, at least part of the processes executed by the software in the above-described embodiments may be executed by hardware circuits dedicated to execution of these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A vehicle settlement system that settles a sales transaction of an item in a cabin, the vehicle settlement system comprising:
   an item detection unit configured to detect removal of the item from an item arrangement unit provided in the cabin;
   an item monitoring unit configured to monitor movement of the item when the item detection unit detects the removal of the item; and
   a settlement processor configured to settle the sales transaction of the item detected by the item detection unit when a predetermined period elapses after the item monitoring unit detects the movement of the item out of the vehicle without a return of the item into the vehicle within the predetermined period.

2. The vehicle settlement system according to claim 1, wherein the settlement processor is configured to cancel the sales transaction of the item when the item monitoring unit detects the movement of the item into the vehicle before the predetermined period elapses from a point in time at which the item monitoring unit detects the movement of the item out of the vehicle.

3. The vehicle settlement system according to claim 1, further comprising:
   a door lock mechanism that locks a vehicle door; and
   an item recognition unit configured to recognize the item removed from the item arrangement unit, wherein
   the door lock mechanism is configured to:
      set the vehicle door to a locked state when the item detection unit detects the removal of the item from the item arrangement unit; and
      cancel the locked state of the vehicle door when the item recognition unit recognizes the item.

4. The vehicle settlement system according to claim 3, further comprising an individual recognition unit configured to perform individual recognition of a user, wherein
   the item monitoring unit is configured to associate the user recognized by the individual recognition with the item detected by the item detection unit when the item detection unit detects the removal of the item from the item arrangement unit, and
   the door lock mechanism is configured to set the vehicle door to the locked state when the user associated with the item moves to an entrance of the vehicle.

5. A vehicle settlement method for settling a sales transaction of an item in a cabin, the vehicle settlement method comprising:

detecting, with a cart processor, removal of the item from an item arrangement unit provided in the cabin;

monitoring, with a vehicle processor, movement of the item when detecting the removal of the item; and settling, with a center processor, the sales transaction of the detected item when a predetermined period elapses after detecting the movement of the item out of the vehicle without a return of the item into the vehicle within the predetermined period.

6. A non-transitory computer-readable storage medium that stores a program that causes a processor to perform settlement processing for a vehicle, the settlement processing comprising:

detecting, with a cart processor, removal of the item from an item arrangement unit provided in the cabin;

monitoring, with a vehicle processor, movement of the item when detecting the removal of the item; and settling, with a center processor, the sales transaction of the detected item when a predetermined period elapses after detecting the movement of the item out of the vehicle without a return of the item into the vehicle within the predetermined period.

* * * * *